United States Patent [19]
Yarr

[11] Patent Number: 5,146,123
[45] Date of Patent: Sep. 8, 1992

[54] LINEAR RECIPROCATING ALTERNATOR

[76] Inventor: George A. Yarr, 215 Paisley Rd., Ballston Spa, N.Y. 12020

[21] Appl. No.: 610,170

[22] Filed: Nov. 6, 1990

[51] Int. Cl.⁵ ............................................ H02K 33/00
[52] U.S. Cl. .................................... 310/15; 310/152; 310/13
[58] Field of Search .................. 310/15, 13, 17, 20, 310/22, 60, 152, 156, 123, 34

[56] References Cited

U.S. PATENT DOCUMENTS

| | | | |
|---|---|---|---|
| 3,772,540 | 11/1973 | Benson | 310/34 |
| 3,814,963 | 6/1974 | Laing | 310/217 |
| 4,349,757 | 9/1982 | Bhate | 310/15 |
| 4,543,502 | 9/1985 | Jarret et al. | 310/15 |

FOREIGN PATENT DOCUMENTS

| | | | |
|---|---|---|---|
| 805924 | 8/1960 | Canada | 310/15 |
| 0019108 | 2/1979 | Japan | 310/15 |

Primary Examiner—Steven L. Stephan
Assistant Examiner—Matthew Nguyen
Attorney, Agent, or Firm—Kevin R. Kepner

[57] ABSTRACT

An electric generating alternator for use with linear reciprocating motive sources. The alternator consists of a plunger with permanent magnets extending radially from a small diameter structurally stable core forming essentially a star configuration and a laminated stator with poles arranged adjacent to the permanent magnets. Coils made of electrical conducting material are wound around portions of the stator to surround the magnetic flux in the laminated stator. The flux in the stator is caused to change by axial reciprocation of the plunger magnets which have dipoles substantially tangential to a circumference of the plunger axis.

13 Claims, 6 Drawing Sheets

LINEAR RECIPROCATING ALTERNATOR

FIELD OF INVENTION

The present invention relates to a reciprocating alternator for electric power generation and is particularly applicable to use with Free Piston Stirling Engines (FPSE).

It is well known to those in the art to couple permanent magnetic rings to the piston of a FPSE to create moving flux generators which then reciprocate adjacent to iron laminations and conductive coils. The magnetic plungers are usually arranged in a manner so as to provide rings of radially magnetized materials. The reciprocation of the magnetic rings within an outer ring of radially arranged planes of iron laminate reverses the flux conducted through the laminate and thereby create an alternating voltage across a coil of conductive material wound around the laminate ring.

The conventional alternator design and construction suffers from several inherent weak points. The magnetic rings, when constructed of the most desirable magnetic materials, are weak and brittle. The rings are also subject to vibration loading and unpredictable local side pull and thermal distortion. Conventional designs also require the shaping of magnet material into precise tubular assemblies with minimal structural support, leading to failure by distortion or breakage of the magnet assembly and subsequent contact with the stator. See U.S. Pat. Nos. 3,814963 to Laing; 4,349,757 to Bhate; and 4,543,502 to Jarret et al.

The coil and lamination design for conventional alternators also suffers on several other accounts. The coils, due to being inside the iron laminations, must be hand wound from the inside of the armature. This necessarily reduces coil packing density as opposed to bobbin-wound coils and increases both size and cost. As the coils are fully enclosed by the lamination, they are not able to be directly cooled and the heat of the copper must be carried through the lamination, thus raising the temperature of the adjacent magnets and reducing the usable field strength of the permanent magnet material.

Another problem with conventional design is the necessity of back iron to close the flux loop of the radially magnetized plunger. To carry the back iron as part of the magnetized plunger analogous to the armature design of a typical rotary alternator would cause an unacceptable level of reciprocating mass, and associated efficiency loss in the FPSE, so the back iron is stationary, thus requiring additional air gaps per flux loop. This creates stray flux leaks and requires additional magnet material to overcome the magnetic resistance of the additional gaps.

In practice it has been found that even more magnet mass and/or special turning capacities are required to balance the high inductive voltage of the conventional large single coil for stable engine operation. Both the extra magnet and capacitors add considerable cost.

It is the intent of the present invention to address and correct the aforementioned problems with conventional alternator design and construction for use with reciprocating power sources. These goals are accomplished by means of the star-plunger and stator design set forth in the drawings and detailed description thereof below.

DETAILED DESCRIPTION OF THE DRAWINGS

Figure 1:
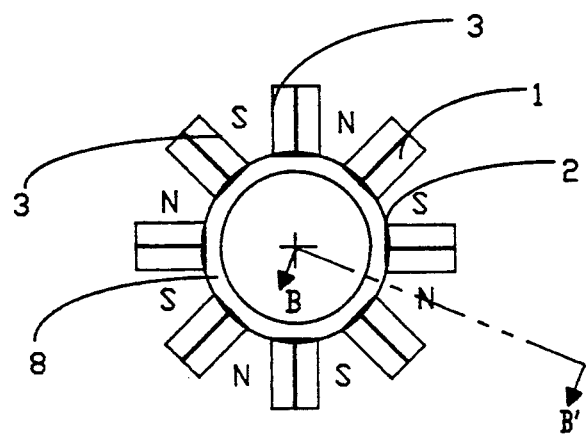
FIG. 1—is an end view of the star plunger according to the invention.
Figure 2:
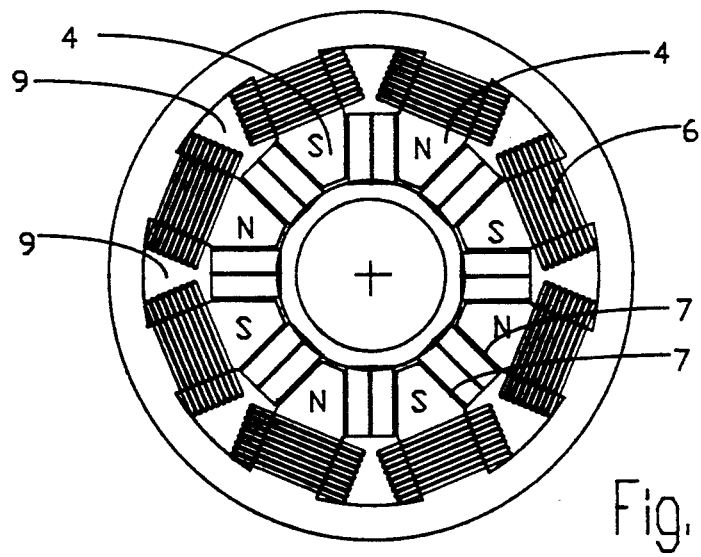
FIG. 2—is an end view of the alternator assembly according to the first preferred embodiment of the invention.
Figure 3:
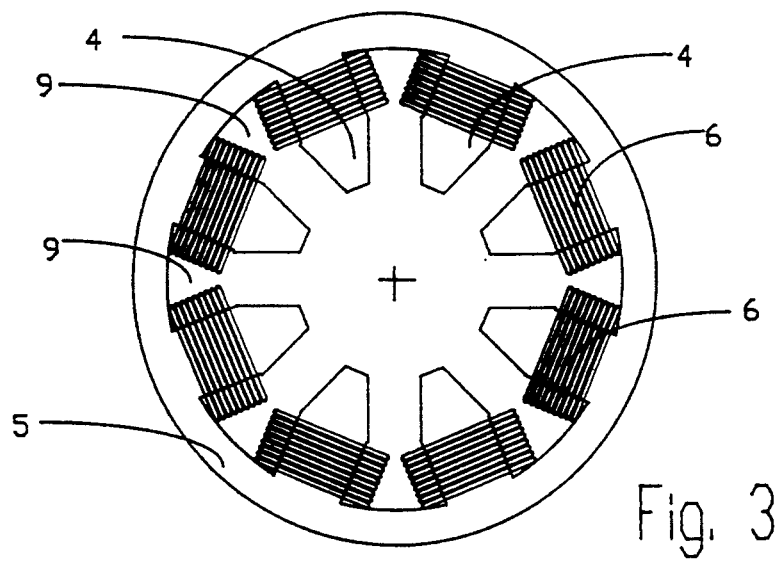
FIG. 3—is an end view of the lamination-stack-coil assembly, according to the first preferred embodiment.
Figure 4:
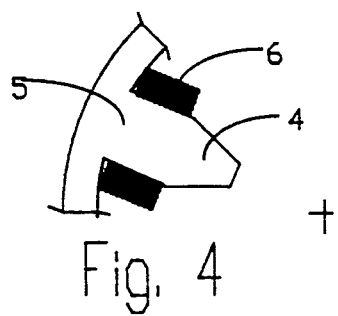
FIG. 4—is a fragmentary section view of section A—A' in FIG. 3, according to the first preferred embodiment.
Figure 5:
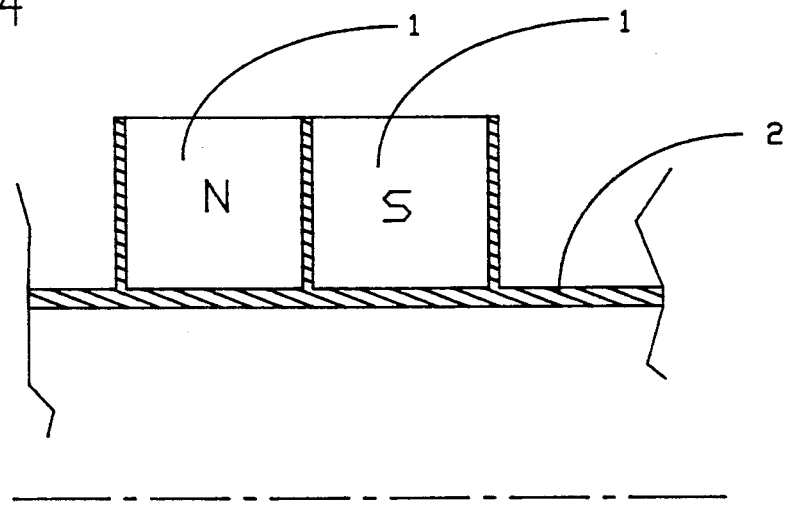
FIG. 5—is a fragmentary exterior side view of section B—B in FIG. 1, according to the first preferred embodiment.
Figure 6:
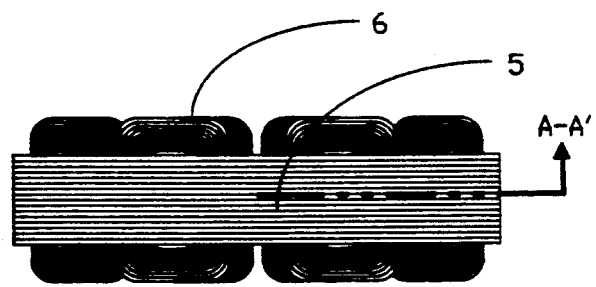
FIG. 6—is a exterior side view of the lamination-stack-coil assembly, according to the first preferred embodiment.

Referring first to FIG. 1 it can be seen that in the first preferred embodiment an even number of substantially flat, rectangular permanent magnets 1 are arranged in a radially-extending configuration spaced around a small diameter reciprocating plunger core 2. As seen in FIG. 5, two sets of magnets are so arrayed, axially adjacent and mounted to a common core, but having oppositely-directed fields. Within each such set, magnets 1 are aligned with their dipoles in alternating substantially circumferential directions such that each side face of a radially extending magnet has the same polarity as the opposite (nearer) face of the circumferentially-adjacent magnet. Referring to FIG. 2 it is seen that each axially-adjacent pair of magnets fits between two adjacent poles 4 of the lamination stack 5 around each of which a coil 6 of electrical conductor is wound. This interdigitating configuration conducts each magnet's 1 flux lines through two coils 6, thereby requiring less magnet mass. Coils may be alternatively positioned around connecting ligaments of the lamination stack. In operation, the plunger's reciprocation switches the magnetic flux direction in the laminations 5 by exposing to the lamination poles 4 more of one set of magnet 1 than its oppositely directed, axially-adjacent counter part. Note that no back iron is required to carry flux-loops and only two air gaps 7 occur in each loop, both optimally adjacent to permanent magnetic material. To provide the optimum close air gap 7, the plunger assembly 8 must be supported by a radially and torsionally stiff suspension, which suspension is the subject of a copending application by the inventors herein. The star plunger 8 design is also structurally far stronger than conventional designs, since small magnetic elements 1 are radially attached to a stable core 2. The core 2 is outside the magnetic flux paths and therefore does not see changing flux and thus can be made of strong materials (e.g. steel) without inducing eddy-current losses.

Figure 10:
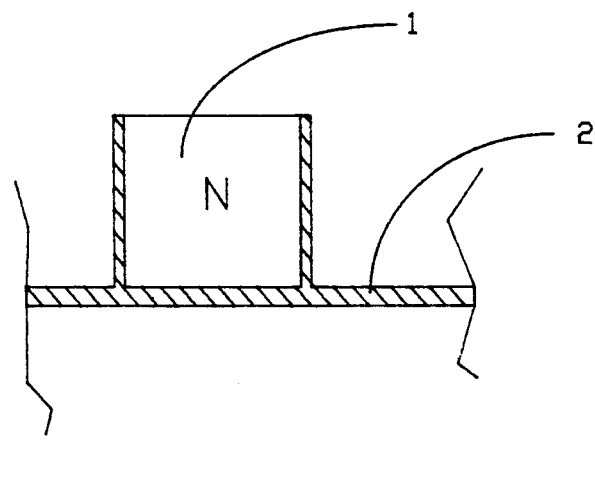
FIG. 10—is a fragmentary plan view of section B—B in FIG. 1, according to the second preferred embodiment.

The second preferred embodiment of this invention is illustrated in FIGS. 7 through 10. In this embodiment the rectangular permanent magnets 1 are also arranged in a radially-extending configuration spaced around a small diameter reciprocating plunger core 2. As seen in FIG. 10 the second embodiment uses only one set of magnets 1 which are arranged in a similar manner as in the first embodiment. The dipoles alternate in substantially circumferential directions such that each side face 3 of a radially-extending magnet has the same polarity as the opposite (rearer) face of the circumferentially adjacent magnet 1. In the second preferred embodiment, as evidenced in FIGS. 7 and 9, the laminations 10 are substantially circumferential or concentric and the poles 4 extend axially as related to the star-plunger 8. An electrical conducting coil 6 is wound around each of the axially extending poles 4. As in the first embodiment it is also possible to wind the coils around the connecting sections 11 of the lamination bundle 12 between the poles 4. The second embodiment in operation reverses the flux direction between one pair of poles 4 and the axially adjacent pair as a result of the reciprocation of the permanent magnet 1 adjacent to the pole pair from one end of the axial stroke to the other end of the stroke. As in the first embodiment, no back iron is required to carry flux loops and the air gaps 7 are optimally adjacent to the permanent magnetic material. The same suspension system as described in the copending application by the inventors herein is required for the optimum operation of the second embodiment. As the star-plunger design 8 is virtually identical for the second embodiment the same advantages are recognized.

Figure 7:
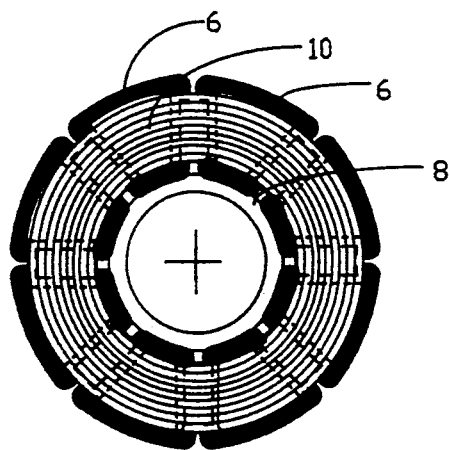
FIG. 7—is an end view of the alternator assembly according to the second preferred embodiment.
Figure 8:
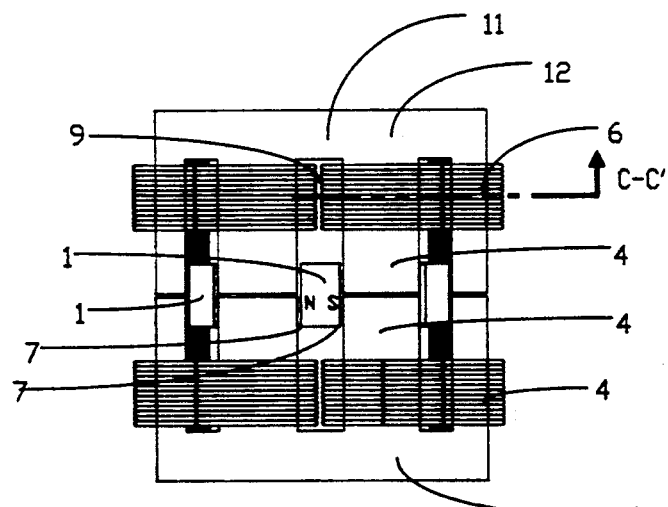
FIG. 8—is an exterior side view of the substantially concentric lamination assembly according to the second preferred embodiment.
Figure 9:
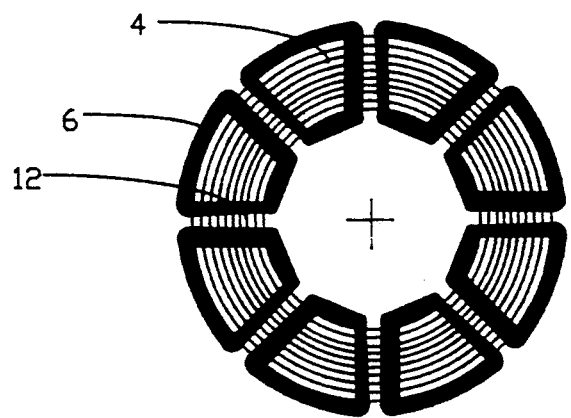
FIG. 9—is an end sectional view along line C—C in FIG. 8.

It can also be seen from FIG. 2, FIG. 7 and FIG. 8 that in the preferred embodiments there are passages 9 between the coils 4 to allow for direct coil and lamination cooling. Lower coil temperature is thus maintained, allowing higher loading of the permanent magnet material without encountering demagnetization effects. This then also allows a reduction in costly magnetic material. Moreover, the present designs allow for conventional bobbin-wound coils 6 to be assembled onto poles 4 of the lamination stack 5 or lamination bundle 12 further thus reducing the size and ultimate cost of the unit.

Figure 11:
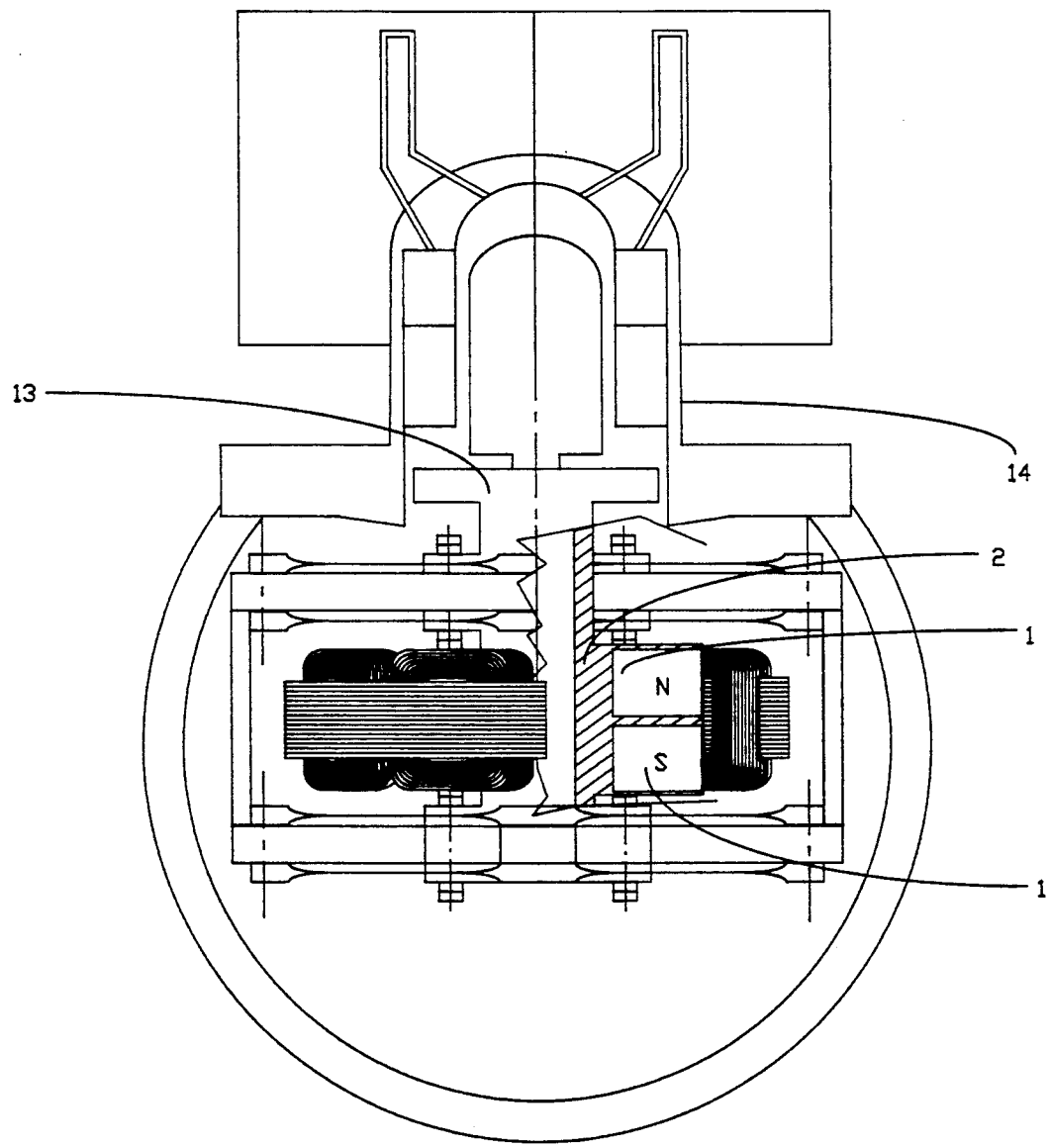
FIG. 11 is a side view of first preferred embodiment with fragmentary section indicating connection of plunger to free piston.
Figure 12:
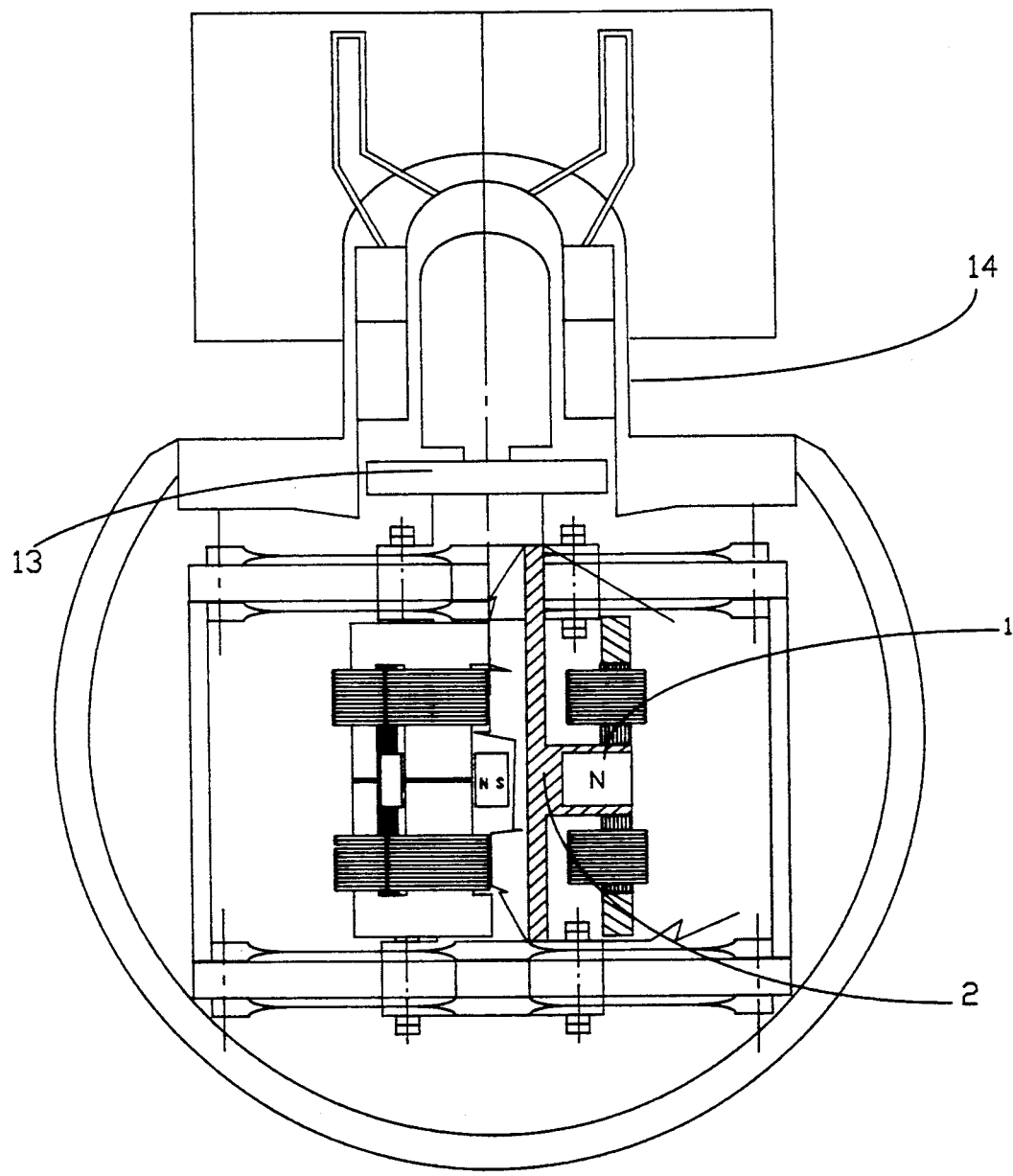
FIG. 12 is a side view of second preferred embodiment with fragmentary section including connection of plunger to free piston.

FIG. 11 shows the connection between the plunger core 2 and the free piston 13 of the Free Piston Stirling Engine 14 in the first preferred embodiment herein. FIG. 12 shows the same connection between the plunger core 2 and the free piston 13 of the Free Piston Stirling Engine 14, in the second preferred embodiment.

In sum, the present invention provides a durable, compact and more cost-effective alternator design particularly well suited for use as a power conversion system with Free Piston Stirling Engines. This use is not intended to be limiting however as use with any reciprocating type motive source is obvious.

What is claimed is:

1. An alternator for the conversion of mechanical energy to electrical energy comprising a magnetic flux generator reciprocatingly mounted within a magnetically conductive stator ring assembly wherein said flux generator comprises a plunger assembly with an even plurality of substantially radially-extending permanent magnets, said magnets mounted to a central structural core, and which magnets align interdigitally with an equal plurality of poles of said stator ring assembly and where a plurality of electrically conductive coils are positioned around portions of said stator ring.

2. An alternator as described in claim 1 wherein said radially-extending permanent magnets are arranged in two axially adjacent layers with oppositely directed magnetic fields and with each of said layers of said magnets arranged with alternately opposite dipole fields substantially tangential to a circumference about said plunger axis.

3. An alternator as described in claim 2 wherein said stator ring assembly is constructed of axially-stacked laminations, with said poles inwardly extending.

4. An alternator as described in claim 3 wherein at least one of said electrically-conductive coils is positioned around each of said inward-extending poles of said stator ring.

5. An alternator as described in claim 4 wherein said plunger is connected to the piston of a Free Piston Stirling Engine.

6. An alternator as described in claim 1 wherein said radially-extending permanent magnets are arranged in a single layer about said plunger axis and with each of said magnets arranged with alternately opposite dipole fields substantially tangential to said plunger axis.

7. An alternator as described in claim 6 with substantially concentric laminations with said poles axially extending in said stator ring assembly.

8. An alternator as described in claim 7 wherein at least one of said electrically-conductive coils is positioned around each of said axially-extending poles of said stator ring.

9. An alternator as described in claim 8 wherein said plunger is connected to the piston of a Free Piston Stirling Engine.

10. An alternator for electrical power conversion comprising a magnetic flux generator reciprocatingly mounted within a magnetically conductive stator ring assembly wherein said flux generator comprises a plunger assembly with an even plurality of substantially radially-extending permanent magnets, wherein said radially-extending permanent magnets are arranged in two axially adjacent layers with oppositely directed magnetic fields and with each of said layers of said magnets arranged with alternately opposite dipole fields substantially tangential to a circumference about said plunger axis, said magnets mounted to a central structural core, and which magnets align interdigitally with an equal even plurality of poles of said stator ring assembly and where a plurality of electrically conductive coils are positioned around portions of said stator ring.

11. An alternator as described in claim 10 wherein said stator ring assembly is constructed of axially-stacked laminations, with said poles inwardly extending.

12. An alternator as described in claim 11 wherein at least one of said electrically-conductive coils is positioned around each of said inward-extending poles of said stator ring.

13. An alternator as described in claim 12 wherein said plunger is connected to the piston of a Free Piston Stirling Engine.

* * * * *